United States Patent
Byrnes

(10) Patent No.: US 6,832,248 B1
(45) Date of Patent: Dec. 14, 2004

(54) SYSTEM AND METHOD FOR MANAGING USAGE QUOTAS

(75) Inventor: Brian Byrnes, Freemont, CA (US)

(73) Assignee: Agami Systems, Inc., San Jose, CA (US)

( * ) Notice: Subject to any disclaimer, the term of this patent is extended or adjusted under 35 U.S.C. 154(b) by 498 days.

(21) Appl. No.: 09/852,516

(22) Filed: May 10, 2001

(51) Int. Cl.[7] .............................................. G06F 15/16
(52) U.S. Cl. ...................................... 709/223; 707/1
(58) Field of Search ................................. 709/220–226, 709/229, 217–219; 707/1–10, 100–104.1, 200–206

(56) References Cited

U.S. PATENT DOCUMENTS

| | | | | |
|---|---|---|---|---|
| 5,701,465 A | * | 12/1997 | Baugher et al. | ............... 707/10 |
| 5,713,013 A | * | 1/1998 | Black | ............................. 707/2 |
| 5,819,047 A | * | 10/1998 | Bauer et al. | ................. 709/229 |
| 5,958,009 A | * | 9/1999 | Friedrich et al. | ........... 709/224 |
| 6,086,618 A | * | 7/2000 | Al-Hilali et al. | ............... 703/2 |
| 6,262,976 B1 | * | 7/2001 | McNamara | .................. 370/254 |
| 6,463,454 B1 | * | 10/2002 | Lumelsky et al. | ........... 709/105 |
| 6,466,980 B1 | * | 10/2002 | Lumelsky et al. | ........... 709/226 |
| 6,516,350 B1 | * | 2/2003 | Lumelsky et al. | ........... 709/226 |
| 6,581,092 B1 | * | 6/2003 | Motoyama et al. | ......... 709/219 |
| 6,584,500 B1 | * | 6/2003 | Arkko | ......................... 709/223 |
| 6,651,101 B1 | * | 11/2003 | Gai et al. | .................... 709/224 |

* cited by examiner

*Primary Examiner*—St. John Courtenay, III
(74) *Attorney, Agent, or Firm*—Gray Cary Ware & Freidenrich LLP

(57) ABSTRACT

A system for managing computer resource usage quotas includes a distributed gateway service, a plurality of clients, an internal network, a distributed storage service a system management service, a configuration database, and a distributed metadata service. A method for managing computer resource usage quotas applied to a plurality of users of data includes the steps of defining one or more resource classes, defining at least one usage policy for the resource classes, tracking quota usage for the usage quotas in accordance with the usage policy, and enforcing quota usage for the usage quotas, and storing the data in accord with the resource class definitions. Optionally, the quota usage may be aggregated.

13 Claims, 6 Drawing Sheets

| Quality of Service (QoS) Attributes | Storage Class/Storage Class ID (SCID)/Storage Class Cost per unit (e.g Adequately Reliable/ 1 / x$) | | | | |
|---|---|---|---|---|---|
| | Adequately reliable/ 1 / x$ | Reliable/ 2 / 2x$ | Very reliable / 3 / 3x$ | Highly reliable/ 4 / 4x$ | Very highly reliable/ 5 / 5x$ |
| Performance | 500 creates/sec | 1000 creates/sec | 1500 creates/sec | 2000 creates/sec | 2500 creates/sec |
| Reliability | RAID 0 | RAID 1 | RAID 2 | RAID 3 | RAID 5 |
| Availability | 1 | 1 | 1 | 1 | 1 |
| Latency | 25 msec | 20 msec | 15 msec | 10 msec | 5 msec |
| Bandwidth | 10 Mbps | 10 Mbps | 10 Mbps | 10 Mbps | 100 Mbps |

FIG. 3

Quota Usage Definition and Reporting

SYSTEM AND METHOD FOR MANAGING USAGE QUOTAS

CROSS-REFERENCE TO RELATED APPLICATIONS

The present application is related to commonly owned, co-pending U.S. application Ser. No. 09/709,187 entitled "Scalable Storage System" by David Raccah et al., filed Nov. 10, 2000; U.S. application Ser. No. 09/731,418, entitled "Symmetric Shared Storage System," by Olaf Manczak et al., filed Dec. 5, 2000; and U.S. application Ser. No. 09/664,677, entitled "File Storage System Having Separation of Components," by George Feinberg et al., filed Sep. 19, 2000; each commonly owned by the present assignee, the contents of each being incorporated herein by reference in their entirety.

FIELD OF THE INVENTION

The present invention relates generally to computing systems, and more particularly to a method and system that define, track, and enforce resource usage quotas based on classes.

BACKGROUND OF THE INVENTION

Computer network technology has improved the exchange of and access to information. As a result, computer use has become pervasive for both business and personal purposes. With increased use, however, has come the requirement for enterprise and co-location hosting facilities to store vast amounts of data. The increased demand for storage presents several challenges to providing a tracking and enforcement system that manages resource usage.

In any computing system, including distributed scalable storage systems, resources are not infinite and must be managed. Among the types of resources that must be managed, are for example and without limitation, storage resources available to system users, bandwidth, and even the number of files. Managing resources requires defining, tracking, and enforcing user quotas associated with each resource. For example, conventional quota tracking and enforcement methods for storage resources often define user quotas in physical terms, such as how much space a user is allocated in a given file system. Although these conventional storage quota management methods are useful in some respects, they fail in others. For example, they do not provide for the definition of other characteristics about a storage resource that may be useful to manage, and they do not track or enforce quotas through the use of logical groupings, also called classes, which allow for more flexibility in quota definition, tracking and enforcement.

Using conventional methods to manage storage quotas, the quotas are viewed in terms of physical bytes. However the cost of resources in a distributed computing system and more particularly a distributed scalable storage system is also influenced by a multitude of other factors. Therefore, traditional storage quota management methods fail to adequately define, track, and enforce usage quotas and appropriately allocate their respective costs.

Thus, there exists in the industry a need to provide an improved quota tracking and enforcement method and system, which apply logical groupings, that is, classes, to user quotas. More particularly, the industry needs a method, which operates in a distributed computing system, which uses classes to define usage quotas, track resource usage, and enforce the defined quotas. The method needs to be applicable throughout the distributed system wherever quotas need to be allocated for a system resource, for example and without limitation, storage quotas. In the case of storage quotas, a user may want to use classes based on quality of service attributes of the system to determine how file space will be allocated. Classes add a level of abstraction to the concept of assigning resources to users. Moreover, a specific cost for storing a file can be associated with each storage class. This means a storage class quota provides information regarding how much storage space a user is allowed to use, while a storage class identifies the cost associated with the type of space that the user can use. Additionally, the method and system should be flexible enough to allow tracking and enforcement of quotas for system attributes for example and without limitation bandwidth and number of files, and not simply those attributes that are defined on a per-directory or per-file system basis.

In light of the above, it would be desirable to arrive at an approach to a quota tracking and enforcement system and method that may be used to monitor and control usage quotas without some or all of the drawbacks to conventional approaches described above.

SUMMARY OF THE INVENTION

Accordingly, it is an advantage of the present invention to provide a quota management system that allows the use of classes to provide highly customizable and easy to use resource usage management.

Another advantage of the present invention is to provide a quota management system in variety of process models such as but not limited to, a single process, multiple processes, or as distributed processes on multiple machines.

A further advantage of the present invention is to provide a highly scalable quota management system that can easily be scaled to provide for the expanding needs of customers.

Another advantage of the invention is to provide a quota management system for allowing the definition of classes that are stored in a configuration database and can be used for resource management.

Another advantage of the present invention is to provide a quota management system for allowing a tracking mechanism that monitors usage quotas.

Another advantage of the invention is to provide quota usage tracking for gathering quota usage information for a partition of a file system.

Another advantage of the present invention is to provide a quota management system for allowing an enforcement mechanism for usage quotas based on classes.

A further advantage of the present invention is to provide a quota management system for allowing the aggregation of the quota information for all partitions of a file system.

In view of the foregoing advantages and others, the present invention provides a system and method for defining, tracking, and enforcing quotas based on classes. According to the disclosed embodiments, a quota usage system may include a quota usage server function, quota usage updater function, and a quota usage database that implements tracking and enforcement services. In addition, the disclosed system and method are scalable. This is in contrast to conventional approaches that include quota tracking and enforcement, but cannot provide class-based quota management or highly scalable and customizable quota management.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 3 is a diagram of an exemplary assignment of quality of service attributes by storage class ID;

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration. The preferred embodiment of the present invention will be described herein with reference to an exemplary implementation in a distributed, highly scalable storage system. However, the present invention is not limited to this exemplary implementation, but can be practiced in any computing environment including a distributed computing environment.

Figure 1:
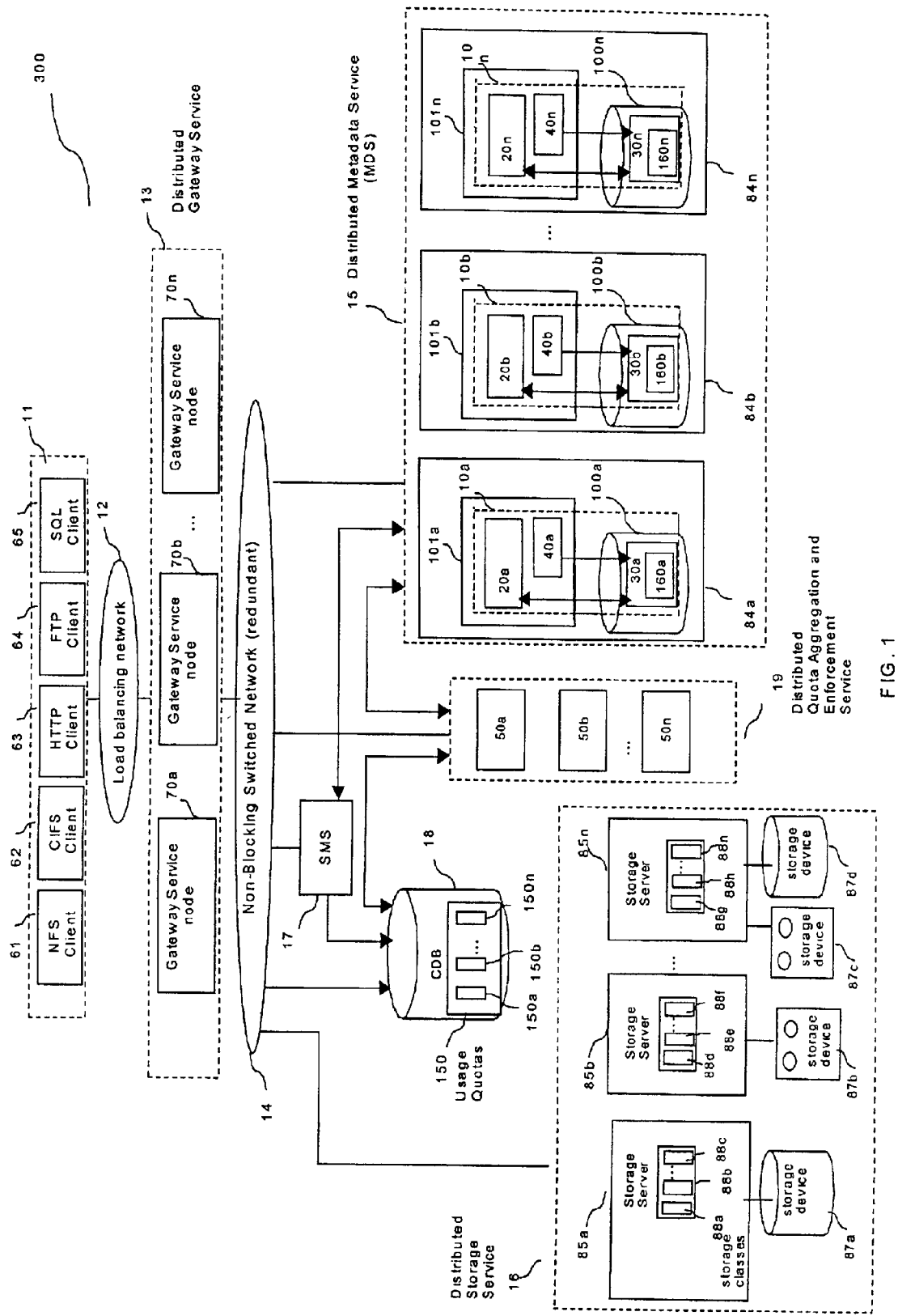
FIG. 1 shows a quota usage management system as a part of a metadata service and a quota aggregation and enforcement process within a scalable storage system.

Looking now to FIG. 1, illustrated is an exemplary distributed, highly scalable storage system 300 incorporating an exemplary quota usage tracking system 10a–10n in accordance with the principles of the present invention. (In general, "n" is used herein to indicate an indefinite plurality, so that the number "n" when referred to one component does not necessarily equal the number "n" of a different component. For example, the number of Gateway Service nodes 70a–70n does not, but may, equal the number of MDS servers 101a–100n in FIG. 1.) The distributed computing environment includes a plurality of clients such as an NFS client 61, CIFS client 62, TV HTTP client 63, FTP client 64, and SQL client 65 (collectively clients 11) capable of connecting to the data network through a load-balancing node 12. These applications are provided for purposes of illustration only, and are not limiting. Users may connect to the system through the NFS client 61, CIFS client 62, HTTP client 63, FTP client 64, or SQL client 65. Load balancing node 12 then connects to one or more Gateway Service nodes 70a–70n, (collectively distributed gateway service 13) which are connected to an internal network 14, for example but without limitation, a switched Internet Protocol (IP) based network. Internal network 14 includes one or more network services that provide connectivity to several distributed scalable services, for example, but without limitation a scalable distributed Metadata Service (MDS) 15, a scalable distributed Storage Service 16, a scalable System Management Service (SMS) 17, and a scalable distributed Quota Aggregation and Enforcement Service 19.

The distributed, scalable MDS 15, which is a component of the storage system 300, can be made up of one or more metadata partitions (84a–84n). A metadata partition cannot belong to more than one file system and each file system has at least one partition. It should be noted that a file system is a logical hierarchical representation ("tree") of, for example and without limitation, files, directories, and devices on a single physical server with a specified "root". Usage quotas apply on a file system basis and not on an individual metadata partition basis.

Each metadata partition (84a–84n) is made up of an MDS Server (101a–10n) and an MDS database (100a–100n). Each MDS Server (101a–101n) includes a Quota Usage Server (20a–20n) function and Quota Usage Updater function (40a–40n). Each MDS Database (100a–110n) includes a Quota Usage Database portion (30a–30n). The terms Quota Usage Server function a and Quota Usage Server are equivalent and can be used interchangeably. The terms Quota Usage Updater function and Quota Usage Updater are equivalent and can be used interchangeably. The terms Quota Usage Database portion and Quota Usage Database are equivalent and can also be used interchangeably. Together, the Quota Usage Server, Quota Usage Updater, and Quota Usage Database make up the Quota Usage System 10a–10n. It should be noted that the Quota Usage Server, Quota Usage Updater, and Quota Usage Database can be implemented as a function within one or more processes or as individual processes while operating within the spirit and scope of the invention.

The distributed, scalable Storage Service 16, which is a component of the storage system 300, can be made up of storage servers 85a–85n and storage devices 87a–87n. Each storage server 85a–85n can include one or more storage classes 88a–88n. Storage classes provide a level of abstraction to quotas by assigning a collection of Quality of Service (QoS) attributes to a particular storage class. Thus, instead of quotas being viewed in terms of physical bytes, quotas can now be viewed in terms of cost. This concept of cost can also be applied to other storage characteristics, such as replicating data locally or remotely, storing data redundantly (using Redundant Arrays of Inexpensive Disks (RAID) or some other device technology), and so forth. QoS attributes can define storage device characteristics, for example and without limitation, performance (speed), reliability (redundancy), and accessibility (availability). Therefore, associated with each storage class is the cost of storing the data. The designation of storage classes is provided by way of example only and those of ordinary skill in the art will understand that numerous other resources such as network bandwidth, CPU usage, and memory usage may be designated and resource classes can be used to provide a level of abstraction to quotas by a assigning a collection of resource-specific QoS to a particular resource class. Similarly, instead of quotas being viewed in terms traditional to the resource, quotas for resources can now be viewed in terms of cost. A distributed, scalable Quota Enforcement Service 19, which is an optional component of the storage system 300, can be made up of one or more Quota Aggregation and Enforcement Service nodes 50a–50n. Each service node aggregates quota usage and quota usage limit information, and initiates quota enforcement for a single file system, that is, for all the partitions that make up a file system.

FIG. 1 also shows that Gateway Service 13 communicates with the MDS 15, Storage Service 16, the SMS 17, and the Configuration Database (CDB) 18 via network 14. The SMS 17 accesses the CDB 18 as well. Within the MDS 15, the Quota Usage Server 20a–20n accesses Quota Usage Database 30a–30n. The MDS server 101a–101n, along with the Quota Usage Server 20a–20n can be a single process on one machine, multiple processes on a single machine, or multiple processes on multiple machines. In addition, one or more Gateway service nodes 70a–70n can access a file system and each file system can have at least one partition in the present invention.

Each MDS 15 manages one or more MDS partitions 84a–84n, but each MDS partition 84a–84n is associated with only one MDS 15. An MDS database 100a–100n for a single file system can contain data for one or more (not shown) metadata partitions 84a–84n. A Quota Usage System 10a–10n handles quota usage information 160a–160n, which applies to a file system as a whole rather than to metadata partitions 84a–84n separately. However, the quota usage information 160a–160n can be maintained on an individual metadata partition 84a–84n basis.

The storage system 300 is illustrated as comprising a distributed Gateway Service 13, made up of Gateway Service nodes 70a–70n, a distributed Storage Service 16, made up of storage servers 85a–85n and storage devices 87a–87n, and a distributed Metadata Service 15, made up of MDS servers 101a–101n and MDS databases 100a–100n, but those skilled in the relevant art(s) will understand, based on the teachings contained herein, that fewer or additional, Gateway Service nodes 70a–70n, storage servers 85a–85n, storage devices 87a–87n, MDS servers 101a–101n and MDS databases 100a–100n, as well as other services may be removed from, or added to the illustrated storage system and still be within the spirit and scope of the invention.

It should be noted that the Storage System 300 as shown in FIG. 1 includes a distributed Quota Aggregation and Enforcement Service 19. Although quota aggregation and enforcement is a valuable feature, its inclusion within a system is determined by customer requirements and the present invention is not necessarily limited by its inclusion or exclusion.

Figure 2:
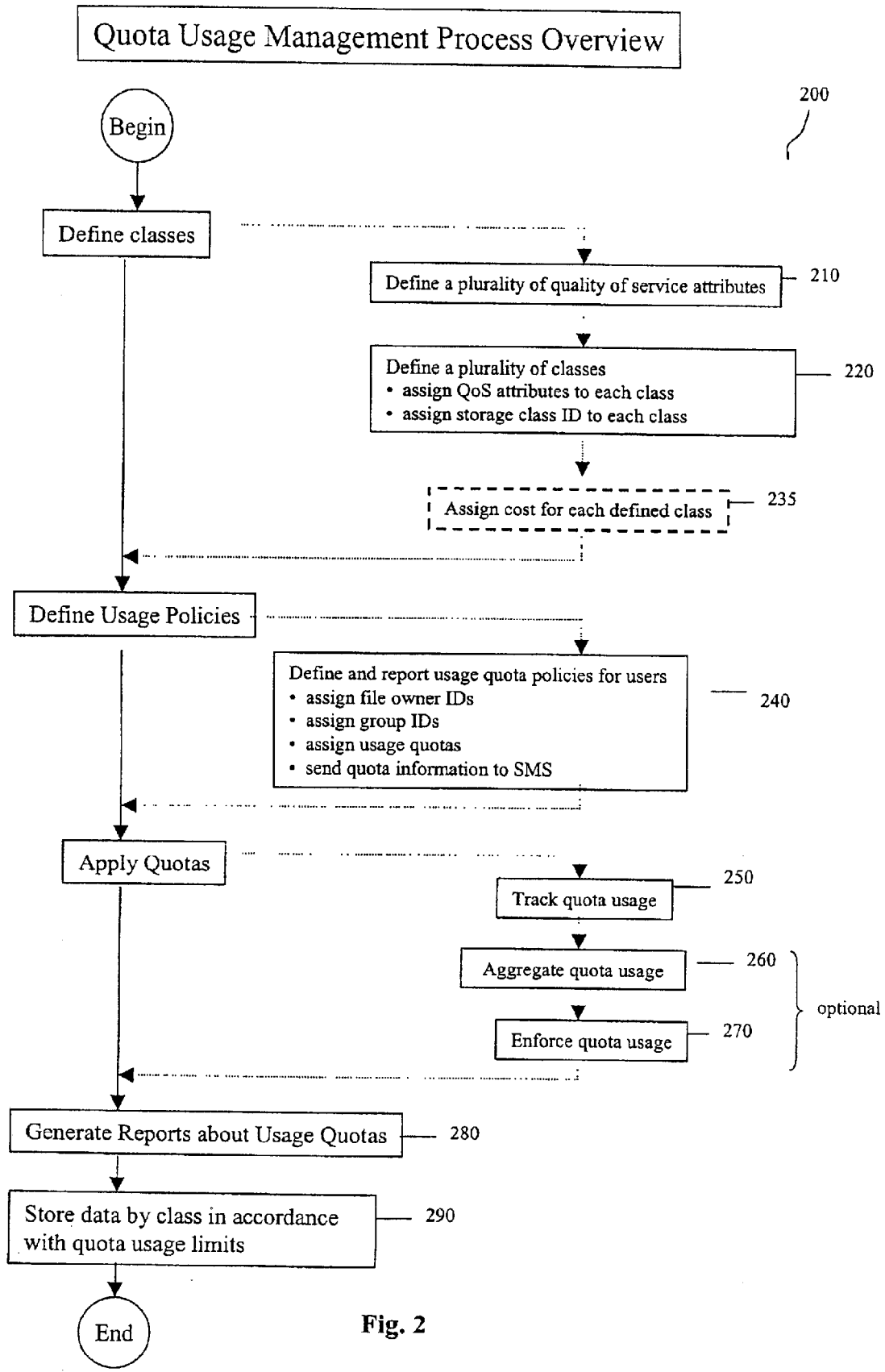
FIG. 2 is a flow chart of a method for management of resource usage quotas.

Looking now to FIG. 2, which is an overview of a method for managing resource usage quotas 200 according to an embodiment of the present invention (steps 210–280). The function of managing resource usage quotas (150 in FIG. 1) requires the definition of classes, definition of usage policies, application of quotas, generation of reports, and the storage of data by resource class in accordance with quota usage limits. Storage classes are provided for purposes of illustration only, and are not limiting. Classes can be defined for any type of resource for which a quota may be desirable. A class adds a level of abstraction to the concept of usage quotas and has the advantage of assigning a cost to a particular class. For example, in the context of storage, using classes to define quotas has the advantage of quotas referring to the cost of storage instead of referring to, for example, actual storage in physical bytes that are to be allocated to a user. It should be noted that when the customer configures a user for a storage system 300, the customer defines classes and defines usage policies. It should also be noted that the Quota Usage System (10a–10n in FIG. 1) interacts with other system components, such as the SMS (17 in FIG. 1), the Gateway Service (13 in FIG. 1), and the Storage Service (16 in FIG. 1) to implement quotas. For example, in the present invention the SMS 17 handles quota definitions that the customer defines; the SMS 17 sets quotas and stores usage quotas (150 in FIG. 1) in the CDB 18. During the class-definition phase of the management of resource usage quotas method, a customer defines the QoS attributes, which define class characteristics, for example and without limitation, performance, reliability, and accessibility, for storage classes (step 210). The QoS attributes can be very flexible and arbitrary based on customer needs. A customer can then define classes by assigning a Class Identification (ID) and QoS attributes to each defined class (step 220). The characteristics of a class depend on the QoS attributes assigned to it. As a result of defining QoS attributes (step 210) and defining classes (step 220), a cost of using that class of resource is implicitly assigned (step 235). The assignment of QoS attributes by Class I D in the present invention will be described below in more detail in connection with FIG. 3.

When at least one class is defined, the management of resource usage quotas method can proceed to the usage-policies-definition phase. During this phase, usage quota policies are defined for a plurality of users (step 240). A usage quota policy helps a customer to automate the quota assignment process, that is, a customer can define a usage policy that can be applied to any number of users. A policy can be defined as a set quotas of one or more storage classes. Any user defined with that policy would have the storage classes associated with the policy assigned to that user. Usage quota policies automate the quota assignment process. Instead of individually assigning quotas of various storage classes to each user individually, policies can be used to easily assign quotas to a class of users. For example, Usage Policy A can assign to each user assigned this policy 10 MB of Very Reliable Storage, 20 MB of Reliable Storage, 10 MB of Adequately Reliable Storage and 5 MB of Very Highly Reliable Storage. Usage Policy B can assign to each user assigned this policy 20 MB of Reliable Storage and 40 MB of Adequately Reliable Storage. The customer can assign Usage Policy A to Users 1–6, and Usage Policy B to Users 7–12. A customer typically configures several users and/or several user groups, that is, a class of users, and for each selected user or user group assigns selected usage quotas for each class defined in steps 210 and 220, for example and without limitation, storage class, as needed, or sets a usage policy. The SMS 17 then creates, in the CDB 18, the quota limits for each user or file system based on the configuration information, that is, specific usage quota assignment or policy, provided by a customer. Defining and reporting quotas in the present invention will be described below in more detail in connection with FIG. 4.

When at least one usage policy is defined, the management of resource usage quotas method can proceed to the application-of-quotas phase. This phase is done without operator intervention. During this phase, the Quota Usage system (10a–10n on FIG. 1), Gateway Service node (70a–70n in FIG. 1), SMS (17 in FIG. 1), CDB (18 in FIG. 1), and a Quota Enforcement Service (19 in FIG. 1) interact to track, aggregate, and enforce quotas.

When quotas are defined for a user or file system in the CDB (18 in FIG. 1), the Quota Usage System (10a–10n in FIG. 1) can track them (step 250). Quotas for a file system or a user may be made up of at least one number, but quotas are often a matrix of storage space, the number of nodes for each storage class, and the sum of all of these. Tracking quotas requires the Quota Usage System to update the information contained in the Quota Usage Database (30–30n in FIG. 1) and to make it available when aggregating, enforcing, and reporting quota usage. Each partition tracks its own quota usage, but it should be noted that quotas apply per file system. Therefore, quota usages should be aggregated. Tracking quotas in the present invention will be described in more detail in connection with FIG. 5.

Quota usage information is maintained on an individual metadata partition basis. Aggregating quota usage information and enforcement allows quota usage information maintained by the Quota Usage System on an individual metadata partition basis to be collected together for an entire file system, that is, for all partitions that make up a file system (optional step 260). A Quota Aggregation and Enforcement Service (19 in FIG. 1) can aggregate quota usage information. Aggregating quotas in the present invention will be described in more detail in connection with FIG. 6.

In addition, because quotas can be defined, tracked, and enforced by file owner or an entire file system (that is, one or more metadata partitions), many different reports relating to quota usage information can be generated (step 280). The customer can customize reports and thereby has flexibility in determining the types of reports to be generated.

Upon successful resource class definition, usage policy definition, and usage quota application (that is, tracking, aggregating, and enforcing), data can be stored accordingly in a Storage Service 16 (made up of interconnected Storage Servers 85a–85n and Storage devices 87a–87n in FIG. 1) by resource class (88a–88n in FIG. 1). The resource class (88a–88n in FIG. 1) dictates the cost of storing data For example, a customer can use a limited number of expensive, high-performance file servers that hold a "working set" of data, and also have a large amount of inexpensive storage (such as low-performance, inexpensive file servers, tape robots, jukeboxes with optical disks, etc.) to provide storage capacity for infrequently used data. A class can define how and at what cost the customer wants to store data. It should be noted that the migration of data from a storage device is entirely transparent and automatic (on-demand upon a request to read or write to a file, or asynchronously whenever a file is being migrated to tertiary storage). Also file data stored initially on any given Storage Server (85a–85n in FIG. 1) can be migrated later to any other node.

Looking now to FIG. 3, the exemplary assignment of QoS attributes and a Class ID to a class in the present invention will now be described. In this example, the class is a storage class and the QoS attributes relate to storage, but the invention is not so limiting. Each storage class 340 is assigned QoS attributes 341, Storage Class ID (SCID) 342 and implicitly a storage cost. The QoS attributes 341 can include individual file, individual directory, and/or distributed computing system characteristics such as performance, reliability, availability, latency, and so forth. These however, are provided by way of example only and those of ordinary skill in the art will understand that numerous other attributes relating to other ways to describe data storage performance of the class may be designated. Each storage class 340, for example, an adequately reliable class, a reliable class, a very reliable class, a highly reliable class, and a very highly reliable class can each be assigned a particular set of values for each of the QoS attributes 341 as defined for that storage class. For example, storage class "reliable", assigned Storage Class ID (SCID) 2, has an implicit storage cost of 2×$. The collection of quality of service attributes 141 assigned to the "reliable" storage class include: performance of 1000 file creations/sec., reliability of RAID1, availability of 1, latency of 20 msec., and bandwidth of 10 Mbps.

Figure 4:
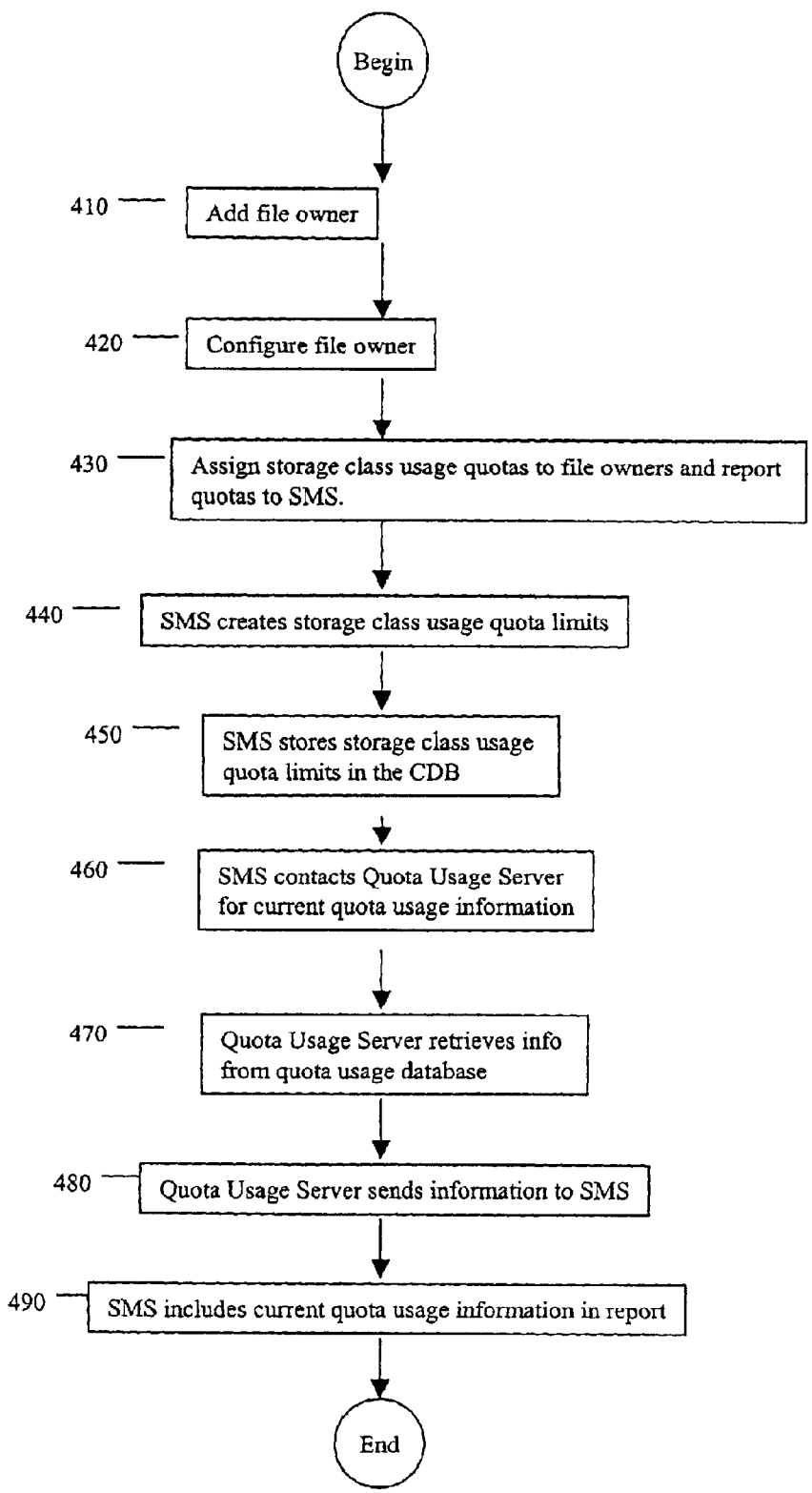
FIG. 4 is a flow chart depicting a method for quota usage definition and reporting.

Looking now to FIG. 4, defining and reporting usage quota policies for users or a file system in the present invention will now be described. When a customer configures users for a system, for example and without limitation a storage system, the customer assigns a quota for each class to each user (or file system) or sets a usage policy. To make such an assignment, the customer must add a file owner by assigning an ID to each file owner (step 410), configure a file owner for the system (step 420), and must assign a usage quota for each file owner based on system capabilities and customer requirements (step 430). When a customer assigns quotas to users or file systems, this information is reported to SMS 17, which handles the processing of the quota definitions. The SMS 17 creates storage class usage quota limits based on the customer-assigned quotas (step 440) and stores them in the CDB 18 (step 450). The SMS 17 then contacts the Quota Usage Server 20a–20n to retrieve current quota usage information 160a–160n (step 460). With this information the SMS 17 can update the information stored in the CDB 18 and generate a usage report. The Quota Usage Server retrieves the information from the Quota Usage Database 30a–30n (step 470), and returns the updated quota usage information 160a–160n to the SMS 17 (step 480). The SMS 17 can then include the updated current usage information in a usage report (step 490). It should be noted that the generated report is based on customer requirements.

Figure 5:
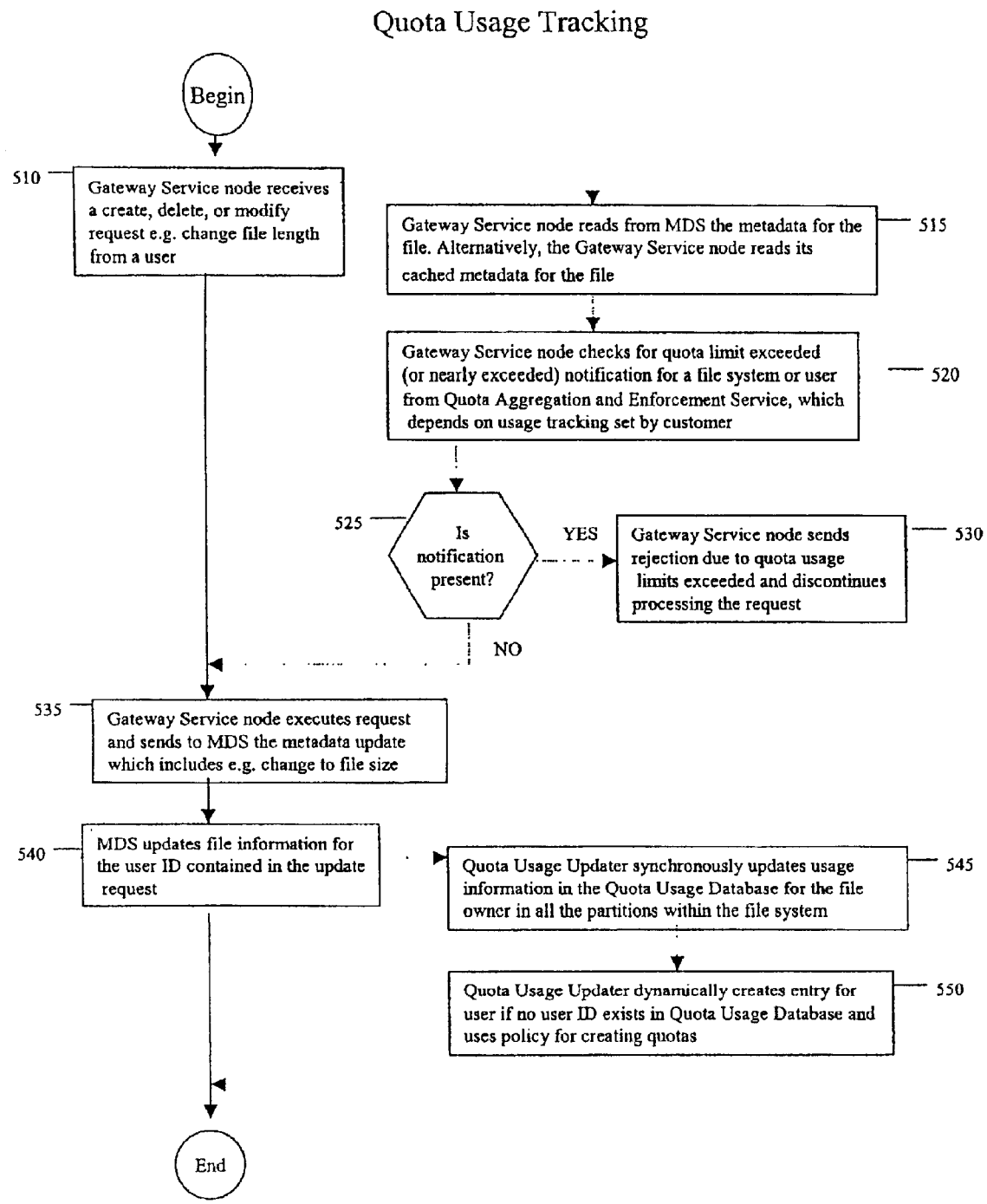
FIG. 5 is a flow chart outlining a method for quota usage tracking based on storage class.

Looking now to FIG. 5, a method for quota usage tracking is shown. A Gateway Service node 70a–70n receives a request to create, delete, or modify a file (collectively, a file modification request), for example and without limitation a request to modify the file length (step 510). The Gateway Service node 70a–70n then reads the metadata for the file (step 515) from the MDS 15, or alternatively, from its own cache. The Gateway Service node 70a–70n can check whether it has received a quota limit exceeded notification for a particular file system or user from the Quota Aggregation and Enforcement Service 19 (step 520). The presence or absence of a notification depends on usage tracking set by a customer. If a notification is not present, the Gateway Service node continues by executing the relevant user request (step 535). If a notification is present for the particular file system or user, the Gateway Service node 70a–70n sends a rejection in response to the relevant user request and discontinues processing it (step 530). If processing is continued from step 525, the Gateway Service node 70a–70n can send a metadata update, in this example, a change to the file size, to the MDS 15 (step 535). The MDS Server (101a–101n in FIG. 1) updates the record in the MDS Database (100a–100n in FIG. 1) for the file contained in the update request and updates the corresponding usage information for the owner identified in the metadata update request (step 540). More particularly, a Quota Usage Updater (40a–40n in FIG. 1) of the MDS Server synchronously updates the quota usage information (160a–160n in FIG. 1) stored in the Quota Usage Database (30a–30n in FIG. 1) of the MDS Database (100a–100n in FIG. 1) (step 545). The Quota Usage Updater 40a–40n updates the stored quota usage information (160a–160n in FIG. 1) using the owner ID. The update, which is based on the update sent from a Gateway Service node, can include file owner (in the case of owner change), file storage class, and file size changes, if any. It should be noted that if the user ID contained in the update does not exist in the Quota Usage Database (30a–30n in FIG. 1) when the Quota Usage Updater 40a–40n receives the update, the Quota Usage Updater 40a–40n dynamically creates an entry for the user ID (step 550).

Figure 6:
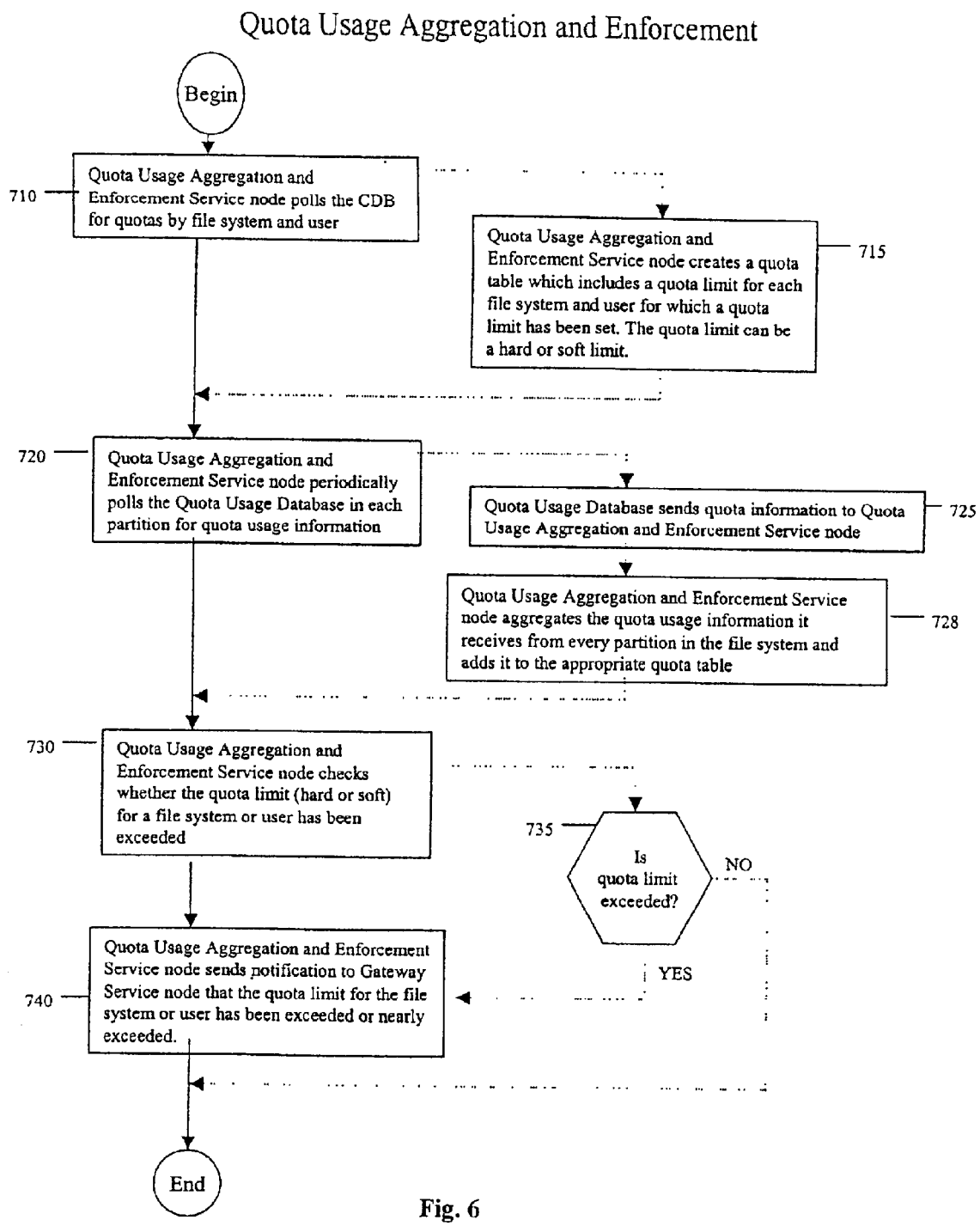
FIG. 6 is a flow chart showing a method for quota usage aggregation and enforcement.

Referring now to FIG. 6, a method for quota usage aggregation and enforcement is shown. Each service node (50a–50n in FIG. 1) aggregates quota usage and quota usage limit information and initiates quota enforcement for a single file system, that is, for all the partitions that make up a file system. Enforcement of usage quotas can be achieved with a Gateway Service node 70a–70n providing the actual enforcement of the quotas, while the Quota Aggregation and Enforcement Service 19 provides the necessary notification to the Gateway Service node 70a–70n to make the enforcement decision. Thus, a Quota Usage System, a Quota Aggregation and Enforcement Service node, and a Gateway Service node combine to achieve quota enforcement.

To gather quota limit information, a Quota Usage Aggregation and Enforcement service polls the CDB 18 for quota limits (step 710). More particularly, each Quota Aggregation and Enforcement Service node 50a–50n polls the CDB 18 for quota limits pertinent to a file system for which it is gathering information. This includes quota limit information about the file system and the users that can own files in that file system. Upon receipt of this information, a Quota Aggregation and Enforcement Service node 50a–50n creates a quota table, which includes quota limit information for a file system, and all users and storage classes associated with that file system for which a quota limit has been set (step 715). Storage classes are defined per user and per file system. When a Quota Aggregation and Enforcement Service node 50a–50n creates a quota table, it can periodically poll the Quota Usage Database in each partition for quota usage information (step 720). The Quota Usage Database sends quota information to a Quota Usage Aggregation and Enforcement Service node (step 725). It can then add the information it receives from the Quota Usage Database to the quota table (step 728). The quota table can then contain the quota limit information as well as the current quota usage information, thereby providing a snapshot of the use of resources by class for each file system and user. The Quota Usage Aggregation and Enforcement Service node 50a–50n checks whether a quota limit for a file system, storage class, or user is exceeded or nearly exceeded (step 730). The quota limit can be a hard quota or a soft quota. A hard quota would be a limit that cannot be exceeded under any circumstances. A soft quota, for example and without limitation, can be exceeded for a predefined period of time with perhaps warning messages sent to the user. A soft quota is more like a policy that determines behavior when nearing the allowable use of resources. For example and without limitation, a soft limit can be made up of three numbers, a soft quota storage size, a predefined time that specifies how long a user can be over the soft quota, and a hard quota. The behavior of an enforcement system when a user is nearing the usage limit can be simple to elaborate depending on customer requirements. For example, once a quota limit is exceeded or nearly exceeded (step 735), the Quota Aggregation and Enforcement Service node 50a–50n can send a notification to the Gateway Service nodes 70a–70n, which can update the relevant file system. The notification can indicate that the quota limit for the file system, storage class, or user has been exceeded or is about to be exceeded (step 740). It should be further apparent to those skilled in the relevant art(s) that policies for handling soft or hard quotas can vary widely and still be within the spirit and scope of the invention.

Whether the Quota Aggregation and Enforcement Service 19 sends a notification when a limit has been exceeded or some measure before can be configurable. It should be noted that the Gateway Service node 70a–70n performs the actual enforcement by rejecting or accepting a request to create or modify a file from a client.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications. It should be further apparent to those skilled in the art that the various embodiments are not necessarily exclusive, but that features of some embodiments may be combined with features of other embodiments while remaining with the spirit and scope of the invention.

What is claimed is:

1. A system for managing a plurality of computer resource usage quotas, comprising:
   a distributed gateway service;
   a plurality of clients for accessing the system, said clients being connected to said distributed gateway service;
   an internal network;
   a distributed storage service;
   a system management service (SMS);
   a configuration database (CDB) for storing the plurality of data storage resource usage quotas, said CDB being connected to said SMS; and
   a distributed metadata service (MDS) connected to said SMS and said CDB.

2. The system as defined in claim 1, wherein the distributed gateway service includes a plurality of gateway service nodes.

3. The system as defined in claim 1, wherein the plurality of clients comprise one of at least one of a NFS client, a CIFS client, a HTTP client, a FTP client, and an SQL client.

4. The system as defined in claim 1, wherein the internal network is a non-blocking switched network.

5. The system as defined in claim 1, wherein the non-blocking switched network has redundancy.

6. The system as defined in claim 1, wherein said storage service includes:
   at least one storage server; and
   at least one storage device connected to said at least one storage sever.

7. The system as defined in claim 6, wherein said at least one storage server includes at least one storage class.

8. The system as defined in claim 6, wherein the said MDS includes at least one metadata partition.

9. The system as defined in claim 8, wherein the at least one metadata partition includes an MDS sever and an MDS database.

10. The system as defined in claim 9, wherein the MDS server includes a quota usage server and a quota usage updater.

11. The system as defined in claim 9, wherein said MDS database includes a quota usage database.

12. The system as defined in claim 1, further comprising:
   a distributed quota aggregation and enforcement service connected to the internal network, the CDB, and the MDS.

13. The system as defined in claim 12, wherein the distributed quota aggregation and enforcement service includes at least one service node for aggregating quota usage and quota usage limit information.

* * * * *